UNITED STATES PATENT OFFICE.

JOHN McCALL, OF HOUNDSDITCH, LONDON, AND BEVAN G. SLOPER, OF WALTHAMSTOW, ENGLAND, ASSIGNORS TO C. J. UNDERWOOD AND W. J. UNDERWOOD, OF BOSTON, MASSACHUSETTS.

IMPROVEMENT IN PRESERVING ARTICLES OF FOOD.

Specification forming part of Letters Patent No. 37,137, dated December 9, 1862.

*To all whom it may concern:*

Be it known that we, JOHN McCALL, of Houndsditch, in the city of London, England, provision merchant, and BEVAN GEORGE SLOPER, of Walthamstow, in the county of Essex, England, chemist, have invented an Improvement in the Preservation of Articles of Food; and we do hereby declare that the following is a full and exact description thereof.

In the preservation of meat and other articles of food it is usual to subject them in tins to heat, in order to drive off air and oxygen contained in the vessels, and in the meat or other articles of food themselves. For this purpose an aperture is made in the tins, through which a portion of the air and oxygen is driven off, and in order to decompose the remaining portion of the air it has been necessary to use such an elevated temperature, or to apply heat for so long a time as to injuriously affect the meat and food.

Our invention consists in introducing into the tins some material or composition for which oxygen has a greater affinity than for the meat or other article of food under preservation, and which at the same time shall be in no way detrimental to it. We have found in practice that sulphite of soda is the best agent for our purpose; but we do not confine ourselves to the use of that substance only. We prefer to incase or cover the sulphite of soda or other suitable material or composition as aforesaid in gelatine or other suitable protecting-coat, to prevent its coming into action before the coat has been dissolved by the heat to which the tin and contents are first subjected, and the time of its solution we vary according to circumstances. About the time we have calculated for its solution we hermetically seal the tin, and then for a short period apply a higher degree of heat, when the oxygen remaining in the tin and in the meat or other food will combine with the sulphite of soda.

Instead of incasing the sulphite of soda or other suitable material or composition, as aforesaid, in gelatine, we sometimes place it in a tin or other suitable metal case, having holes or perforations first made therein, and then closed by a metal which will become fused on being exposed to the higher degree of heat hereinbefore mentioned after the outer tin case has been hermetically closed.

What we claim as our invention, and desire to secure by Letters Patent, is—

The within-described process of preserving articles of food by the introduction of sulphite of soda or its equivalent into the cans in which the articles are preserved, in the manner and for the purpose herein described.

JOHN McCALL.
B. G. SLOPER.

Witnesses:
  I. C. NEWBURN,
    166 *Fleet St., London.*
  J. R. WYNN,
    24 *Royal Exchange, London.*